Nov. 4, 1969  G. NOMARSKI  3,476,457
OPTICAL INSTRUMENT WITH ALIGNED MASK AND
NONPHASING COATED SCREEN
Filed March 27, 1967  3 Sheets-Sheet 3

Georges Nomarski
By Littlepage & Quaintance
Attys.

United States Patent Office 3,476,457
Patented Nov. 4, 1969

3,476,457
OPTICAL INSTRUMENT WITH ALIGNED MASK AND NONPHASING COATED SCREEN
Georges Nomarski, Bourg la Reine, France, assignor to Etablissement Public Centre National de la Recherche Scientifique, Paris, France, a corporation of France
Filed Mar. 27, 1967, Ser. No. 626,078
Claims priority, application France, Mar. 28, 1966, 55,153
Int. Cl. G02b *21/12*
U.S. Cl. 350—17                      6 Claims

ABSTRACT OF THE DISCLOSURE

The invention relates to an optical apparatus with a condenser and an objective, operating with at least partially coherent illumination; the objective exit pupil is provided with at least one annular screen or coating which is light absorbing and nonphase-changing, and the condenser entrance pupil provided with a plurality of annular apertures whose images thus formed exactly cover the absorbent rings placed at the exit pupil.

---

An object of this invention is to provide an optical apparatus applying diffraction laws and which enables improving fidelity when reproducing an object either by projection or photographically, or also when ocularly observing. This invention may be applied for instance to microscopy of self luminous bodies; it may be utilised for photographic enlarging or reducing of negatives or any transparent object. However, this invention does not relate to reflecting or refracting telescopes, binoculars, nor film or motion-pitcure cameras aiming objects which emit reflection-diffused light.

Figure 5A:
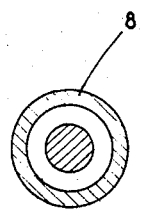
Figure 5:
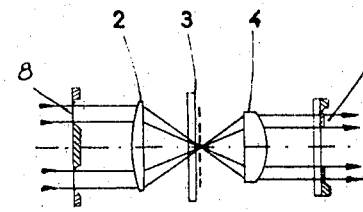

FIGURE 5 schematically represents a system according to the present invention in which an absorbing screen is used.

FIGURE 5a is a plane view of source 8 in FIGURE 5.

Figure 5B:
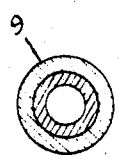

FIGURE 5b is a plane view of absorbing screen 9 in FIGURE 5.

Figure 6:
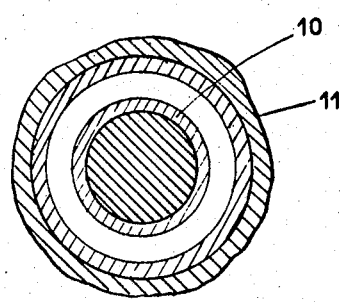

FIGURE 6 is a detail of an alternative screen or coating for a pupil or objective lens.

Figure 1:
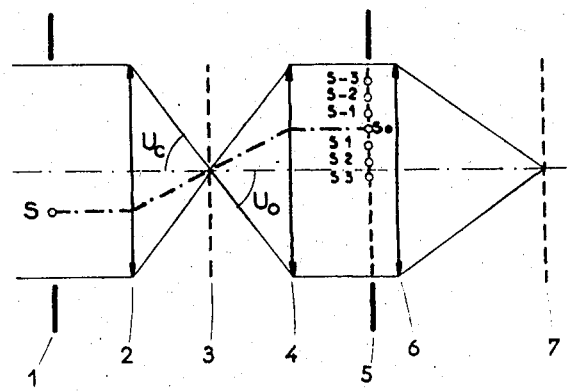
FIGURE 1 is a schematic drawing of microscopically observing plane transparent objects.

It is advisable to first recall general information about fidelity of images obtained from optical instruments. The case of a microscope observing plane transparent objects, the diagram of which is shown on FIGURE 1 of drawings, is considered.

In such a microscope, the entrance pupil 1 of the condenser 2, the object plane 3 and the objective 4 having a maximum aperture U, as shown. The microscope comprises an exit pupil 5 of the objective 4, and an auxiliary objective 6 which gives a real image 7, which may be either formed in the photographic receiver or observed with a not-shown eye-piece.

It is assumed that the object is plane, that its transparency varies from a point to another. The object is optically defined by a two-variable function $(x, y)$ which is equal to the light-amplitude transmission in the point $(x, y)$ or else by the function $O(x, y) = \Omega\Omega^*$, equal to the light intensity transmission factor.

The image plane 7 is conjugate of the plane 3 through the optical apparatus 2, 4.

If the microscope was able to give a perfectly faithful image, the relation $I(x, y) = O(x, y)$ would have to be true, but it is never achieved. There always exists a loss of information due to the transmission process of an optical message from the plane 3 to the plane 7, even in case of perfect lenses.

If it is assumed that the optical apparatus 2, 4 is geometrically perfect, the most rational way to compare $I(x, y)$ with $O(x, y)$ consists of expanding those functions, each representing a form of distribution of energy, in Fourier series, and of comparing the coefficients of equal spatial frequency. Such a mathematical operation is perfectly sound, in consideration of the "physical" character of functions I and O.

If one considers, to simplify, the functions of one variable $x$, and if one replaces the series by the Fourier integral, the following identiities are obtained:

$$O(x) = \int o(u) e^{-j2\pi ux} du$$
$$I(x) = \int i(u) e^{-j2\pi ux} du$$

In these expressions, $u$ designates spatial frequency, and $o(u)$, $i(u)$ are the intensity spectra of the object $O(x)$ and of the image $I(x)$. These spectra are functions of said spatial frequency $u$.

The comparison of the image with the object may be expressed by the ratio $i(u)/o(u)$, but that ratio is only useful on the condition that it is a function of the only variable $u$, i.e. it remains unchanged whatever the object may be.

That condition is exactly fulfilled in the case of objects $O(x)$ in which no phase relation exists between light radiations emitted by the different points of the object plane.

In the case of microscope, which has been taken as an example, the above condition is approximately fulfilled when the maximum aperture angle $U_c$ of the condenser is much greater than the corresponding angle of the objective.

The transmission from $O(x)$ to $I(x)$ is then said linear, and it is characterized by the modulation function defined by equation:

$$i(u) = d(u) o(u)$$

The factor $d(u)$ entirely characterizes the instrument and enables to expect a less of fidelity in images whatever the spectral content $o(u)$ of the object, on condition that the object receives an incoherent illumination.

Figure 2:
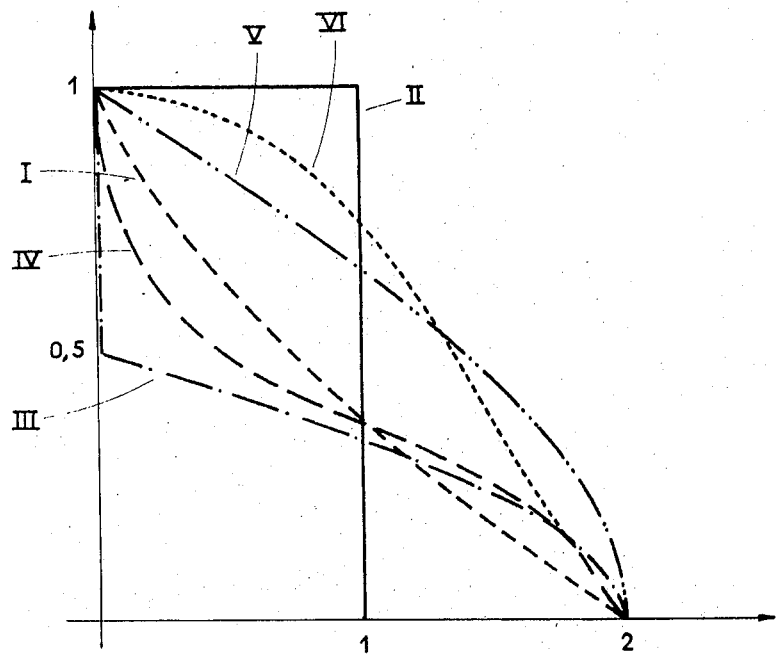
FIGURE 2 is a graph of various modulation function curves.

The modulation function $d(u)$ may be represented by curve I of FIGURE 2. The modulation function $d(u)$ is plotted as the ordinate, and the spatial frequency $u$, normalized by expressing it in lines per wavelength, and divided by the objective aperture $U_o$.

That aperture $U_o$ has to be replaced by $\sin U_o$ in the case of high power objectives having a big magnification. As can be seen on figure, the form $d(u)$ resulting as known from the autocorrelation:

$$\bar{d}(u) = P_o(u) \star P_o^*(-u)$$

(the star ★ indicates the convolution of the two functions $P_o$. $P^*$ is the complex conjugate of P) of the circular pupil of the objective, is not very favourable to maintain the informations about the components $o(u)$ of high spatial frequency $u$ (between 1 and 2) $\epsilon[1, 2]$.

But that linear theory does not apply to optical instruments in which the maximum illumination aperture $U_c$ is comparable to the objective aperture $U_o$.

That means spectra $i(u)$ do exist but the ratio $i(u)/o(u)$ is a function not only of $u$ but also of the whole spectrum of a particular object.

I shall now consider objects $\Omega(x)$ which nevertheless their to deal with them according to a pseudolinear treatment. I shall then describe suitable means to improve forming of images in instruments characterized by the inequality $U_c \leqslant U_o$, i.e. involving a partially coherent lighting.

Figure 3A:
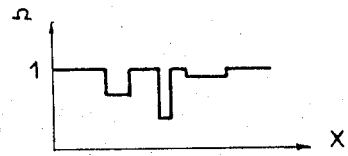
FIGURES 3a, 3b and 3c represent varied typical transparency distributions in certain objects.
Figure 3B:
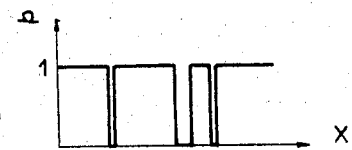

Objects allowing pseudolinear treatment exist and are divided into two groups:

(a) Object with low contrast, the typical transparency distribution is shown in FIGURE 3a;

(b) Black object on white ground, in which the black area is very little with respect to the white area (curve shown in FIGURE 3b).

Figure 3C:
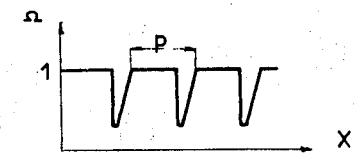

The representative curve shown in FIGURE 3c corresponds to an object of group b which is furthermore a periodic object with a period p.

That object, if placed in the microscope, and illuminated by any pin-hole source of light which source is a part of an extended source placed in the entrance pupil of the condenser 2, would give a diffraction spectrum centered in the image $S_o$ obtained from S (FIGURE 1), and composed of equidistant maxima $S_1 \ldots S_n$ and $S_{-1}, S_{-2} \ldots S_{-n}$.

It is known that the image $I(x)$ is obtained by interference of waves arriving from all the maxima which are not diaphragmed by the aperture 5.

Furthermore, that diaphragming is not symmetrical, but it depends on the position of the considered points. Thus, it is easily understood that relations between $I(x)$ and $\Omega(x)$ are very complicated.

The dark part of the object $\Omega(x)$ is assumed to be small in comparison to the period p, whereby the amplitude of the maximum $S_o$ will be much greater than all the other maxima and even than their sum.

Therefore, one may ignore the contribution to the final image $I(x)$, of the mutual interference of diffracted waves with respect to the interference of these waves with the wave emitted by the central maximum $S_o$.

One may prove that the relation between image and object then results from a linear transformation, even in the case of partially coherent illumination. Object and image spectra are respectively written:

$$\mu(u) + o(u)$$
$$\mu(u) + i(u)$$

where $\mu(u)$ is an impulse function symbolizing the central maximum $S_o$.

The modulation function $\overline{d}(u) = i(u)/o(u)$ now depends not only on the objective pupil 5 but also on the energy distribution S in the condenser pupil 1. It then comes:

$$\overline{d}(u) = [S(u) \cdot P(u)] \star P^*(-u)$$

That expression means the modulation function equals the correlation of the objective pupil with that very pupil multiplied by the distribution of radiances in the condenser pupil. In as much as that law, and as in many cases the object may be classed in either group shown in FIGURES 3a and 3b, one may expect to obtain a modulation function $\overline{d}(u)$ having a better form than $d(u)$ which characterizes images of an incoherent object obtained with a circular pupil.

That the modulation function $\overline{d}(u)$ depends on light distribution in plane I shows that in practice the observed results will be strongly influenced by the ratio $U_c/U_o$ existing between the condenser aperture and the objective aperture. One may consider several cases:

(1) If the ratio $U_c/U_o$ tends to zero, the illumination is called spatially coherent, and the curve $\overline{d}(u)$ is a horizontal straight line, but the cut-off frequency $U_m$ equals 1.

The result is shown by curve II in FIGURE 2.

Images present an excellent contrast, but their resolution is reduced to half the maximum possible resolution.

(2) If it is assumed that $U_c = U_o$, which corresponds to identical apertures of condenser and objective, the modulation function $\overline{d}(u)$ is identical with the modulation function $d(u)$, the representative curve is curve I of FIGURE 2.

(3) If one utilizes an annular illumination with a very narrow ring $U_c = U_o$ curve $\overline{d}(u)$ is situated above the preceding curve, between $U=1$ and $U=2$, but general contrast is equal to only ½ due to the central peak of $\overline{d}(u)$, the corresponding curve is curve III in FIGURE 2.

(4) If one utilizes an annular illumination corresponding to a ring with a width $\Delta U/U = 1/5$ and with $U_c = U_o$, a similar curve is obtained, shown in curve IV in FIGURE 2: central peak is smoothed off but general contrast is again bad.

From above considerations, an object of this invention is to provide an apparatus which gives a modulation curve much improved with regard to known apparatus, which results in reproducing an object with a great fidelity and a very high resolution.

For this purpose, and according to this invention, the improvements of fidelity and image resolution given by optical instruments utilizing a partially coherent illumination and comprising one condenser and one objective, are characterized in that the objective exit pupil is provided with at least one annular screen or coating which is absorbing and non phase-changing, and in that the condenser entrance pupil is provided with one or a plurality of annular apertures, said apertures having such diameters as the geometrical images of ring-sources thus formed cover exactly and without overlapping the absorbing coatings placed in the objective exit pupil.

According to another feature of this invention, the outer diameter of the absorbing coating or ring is chosen equal to the maximum objective diameter, while said ring width is chosen below a quarter of the radius. One may determine the transmission factor as a function of ring width by the relation $$T = \frac{D^2}{(1+D)^2}$$

where D is the ratio of inner to outer ring diameter.

Finally, this invention may be carried out with objectives having a central obturation; in that case, two absorbing rings are placed in the exit pupil and bear on both edges of the annular objective aperture, said objective being centrally closed, and two corresponding ring-sources are provided in the condenser entrance pupil.

Advantageously, the ratio of the smallest ring to the biggest one is included between 1 and ½.

In FIGURE 5 of the drawings, an apparatus according to the invention is shown; there annular mask 8 in optical alignment with a light source absorbing and the annular screen 9 can be seen.

With an annular screen 9 being very narrow and non phase-changing, having an energy transmission factor equal to 1/4, the modulation function $\overline{d}(u)$ is shown in curve V of FIGURE 2. The image contrast is very good, and an excellent resolution is obtained since $\overline{d}(u)$ is everywhere above $d(u)$.

Likewise, when a wider source is desired, for example $$\frac{\Delta U}{U} = \frac{1}{5}$$

it is necessary to use an absorbing coating with the same geometric shape as the ring-source and the transmission factor T of which may be either 1/4 or slightly below, according to the following relation:

$$T = D^2/(1+D)^2$$

where D is the ratio of the inner to outer ring diameter. That corresponds to the device shown in FIGURE 5, where the annular source 8 and the annular absorbent screen 9 can be seen. The modulation function $\overline{d}(u)$ is then represented by curve VI in FIGURE 2.

It is very important that the outer ring diameter is equal to the maximum diameter of the objective exit pupil 5, and that the image of source actually covers the entire surface of absorbing coating.

The method according to the invention has nothing in common with phase contrast method, since the corresponding device is designed to observe the amplitude of objects and not their phase. Its main object is to improve image fidelity and resolution in any case when an artificial source is used to illuminate an object to be optically reproduced.

Within the invention scope, improvement of images is also possible in instruments showing a strong central obturation, as for example two-mirror objectives which are very useful for obtaining images outside visible radiation range, specially in ultraviolet and infrared.

Figure 4:
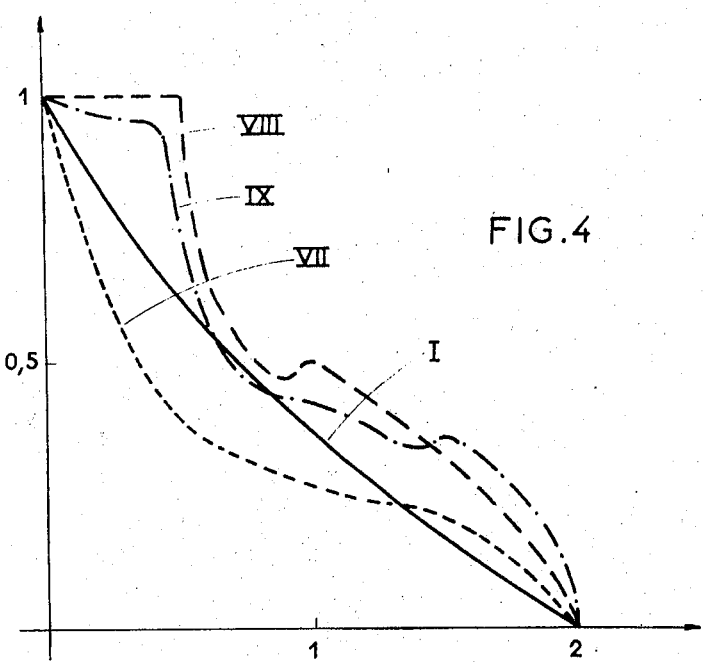
FIGURE 4 represents modulation function curves.

In FIGURE 4, various situations corresponding to that latter case: curve VII represents $\bar{d}(u)$ function in the case when the objective pupil has a central obturation equal to 1/2 and when the maximum objective and condenser apertures are equal. That curve shows this time a bad general contrast because the modulation function $\bar{d}(u)$ is very sharp pointed near spatial frequency $u=o$.

Curve VIII corresponds to the case when on the one hand the source is composed of the two rings having the same width and apertures respectively equal to the two radii of obturated pupil, and when, on the other hand, the objective and/or the pupil comprises two absorbing coatings 10 and 11 with a transmission factor equal to 1/4 (see FIGURE 6). One notes the perfect straightening of $\bar{d}(u)$ up to $u=0$, 5, which may be sufficient in many practical cases.

Finally, curve IX represents $\bar{d}(u)$ function in the case when the inner ring 10 (FIG. 6) has a width twice smaller than that of the outer ring 11 (FIG. 6). Though uneven, the shape of $\bar{d}(u)$ approaches that of $d(u)$ represented by reference curve I of FIGURE 4, which clearly shows efficiency of the method according to the invention. That method could be called "pseudo-filtering using partially coherent illumination."

The absorbent ring or absorbing coating is made of a thin layer of a material obtained by vacuum vaporization.

What I claim is:

1. An optical apparatus comprising a light source providing at least partially coherent illumination, at least one condenser lens with an entrance pupil, an annular mask located at the entrance pupil on the optical axis for illumination by said source, an objective lens with an exit pupil, an annular screen at the exit pupil, the annular mask, condenser lens, objective lens and annular screen being aligned parallel to each other and perpendicular to an optical axis extending therethrough, at least one annular aperture arranged in the annular mask, at least one annular illumination-absorbing and non phase-displacing coating on the annular screen, diameters of the at least one annular aperture and the at least one annular coating being interrelated such as annular illuminated images of the light source given through the mask and condenser and objective lenses exactly cover said absorbing and non phase-displacing coatings on the screen.

2. An apparatus according to claim 1 in which a transmission factor of said annular coating is defined, as a function of annular coating width, by relation:

$$T=D^2/(1+D)^2$$

where D is the ratio of inner to outer annular coating diameter.

3. An apparatus according to claim 1 in which the outer diameter of absorbing coating equals the maximum objective lens diameter, and said absorbing coating ring width is below a quarter of an aperture radius.

4. An optical apparatus comprising a light source providing at least partially coherent illumination, an entrance pupil, an annular mask at the entrance pupil, at least one condenser lens, an objective lens, an exit pupil, and an annular screen at the exit pupil, the annular mask, condenser lens, objective lens and annular screen being sequentially aligned parallel to each other and perpendicular to an optical axis extending therethrough, at least one annular aperture arranged concentrically in the annular mask to pass at least one annular radiance through the condenser and objective lenses and on to the annular screen, said screen being light absorbing and non phase-changing and having a transmission factor below 1/4, the annular aperture diameters being such that annular radiances passing through the entrance pupil, condenser lens and objective lens exactly cover said absorbing and non phase-changing screen.

5. The optical apparatus of claim 4 wherein two annular apertures are arranged in said mask, forming annular light radiations, and wherein the annular screen has a central obturation surrounded by an annular aperture having an inner edge and an outer edge, a smaller and a greater absorbing coating rings respectively bearing on inner and outer edges of said annular screen aperture, annular light radiations of said entrance pupil passing through the condenser and objective and exactly covering the screen aperture and said absorbing rings.

6. An apparatus according to claim 5, in which a ratio of the smaller ring width to the greater is between 1 and ½.

References Cited
UNITED STATES PATENTS

| | | | |
|---|---|---|---|
| 1,501,979 | 7/1924 | Willson | 350—205 |
| 2,959,105 | 11/1960 | Sayanagi | 350—314 X |
| 3,045,530 | 7/1962 | Tsujiuchi | 350—13 X |
| 3,090,281 | 5/1963 | Marechal et al. | 350—205 |
| 3,178,997 | 4/1965 | Kelly | 350—196 |
| 3,180,216 | 4/1965 | Osterberg | 350—13 |

DAVID SCHONBERG, Primary Examiner

P. R. GILLIAM, Assistant Examiner

U.S. Cl. X.R.

350—91, 205

UNITED STATES PATENT OFFICE
CERTIFICATE OF CORRECTION

Patent No. 3,476,457 November 4, 19(

Georges Nomarski

It is certified that error appears in the above identified patent and that said Letters Patent are hereby corrected as shown below:

Column 2, line 70, "their to deal with them according to should read -- allow their --. Column 4, line 47, "alignment with a light source absorbing and the annular" should read -- alignment with a light source and the absorbing annular --

Signed and sealed this 3rd day of March 1970.

(SEAL)
Attest:

Edward M. Fletcher, Jr.

Attesting Officer

WILLIAM E. SCHUYLER,

Commissioner of Pate: